United States Patent [19]

Rosenbaum

[11] Patent Number: 4,978,579
[45] Date of Patent: Dec. 18, 1990

[54] MULTI-LAYER FILM STRUCTURES FOR PROVIDING TWO WEBS OF FILM

[75] Inventor: Larry A. Rosenbaum, Gurnee, Ill.

[73] Assignee: Baxter International Inc., Deerfield, Ill.

[21] Appl. No.: 350,379

[22] Filed: May 11, 1989

[51] Int. Cl.$^5$ .................. B32B 27/30; B32B 27/32; B32B 27/36

[52] U.S. Cl. ................... 428/483; 428/36.7; 428/518; 428/520; 428/522

[58] Field of Search .............. 428/483, 522, 36.7, 428/520, 518

[56] References Cited

U.S. PATENT DOCUMENTS

| | | | |
|---|---|---|---|
| 4,015,051 | 3/1977 | Offermann et al. | 428/483 |
| 4,608,302 | 8/1986 | Schirmer | 428/520 |
| 4,704,314 | 11/1987 | Hsu et al. | 428/35 |
| 4,774,146 | 9/1988 | Dehennau et al. | 428/518 |

FOREIGN PATENT DOCUMENTS

| | | | |
|---|---|---|---|
| 0322199A2 | 6/1989 | European Pat. Off. | 428/36.7 |
| 4152085 | 11/1979 | Japan | 428/483 |
| 0229750 | 11/1985 | Japan | 428/522 |

*Primary Examiner*—Ellis P. Robinson
*Assistant Examiner*—Dhirajlal S. Nakarani
*Attorney, Agent, or Firm*—Paul C. Flattery; Amy L. H. Rockwell; Paul E. Schaafsma

[57] ABSTRACT

The present invention provides film structures for creating two identical webs of film. Preferably, the so created webs of film include a sterile surface. The webs of film are suitable for being processed into flexible containers.

44 Claims, 1 Drawing Sheet

MULTI-LAYER FILM STRUCTURES FOR PROVIDING TWO WEBS OF FILM

BACKGROUND OF THE INVENTION

The present invention relates generally to thermoplastic webs of film. More specifically, the present invention relates to a film structure for creating two webs of film each preferably having a sterile surface.

It is known to utilize thermoplastic webs of film to create flexible containers for housing products. These flexible containers can be utilized in many industries and are utilized in the medical industry for containing, inter alia, parenteral solutions such as intravenous solutions, dialysis solutions, frozen drugs, nutrition products, respiratory therapy products, and plasma. When these containers are utilized in the medical industry, because they will contain fluids or solids that are introduced into a patient's body, it is necessary for the containers to be: essentially transparent; flexible; essentially free of extractables; and capable of maintaining the product contained therein under sterile conditions until the product is accessed or removed from the flexible containers.

There are a variety of methods through which a web of film can be created into a flexible container for housing a product, such as a medical product. One such method is to take two identical webs of film and seal them along their edges to create a container for housing a product. Another method is to create, in, for example, a form, fill, seal packaging machine, a flexible container for housing a product.

In either of these methods, it is necessary, if the web of film to be used to provide a sterile or clean containment area, for the film to be washed and/or sterilized typically before it enters the packaging machine, but, at least before it is created into a flexible container. One method for so washing the film is to utilize a bath through which the film is passed. The bath houses a solution such as, for example, a solution of hydrogen peroxide, that functions to wash the film before the film is fed into the packaging machine.

It would be desirable, if the web of film could be supplied to the packaging machine in a sterile state so that a washing and/or sterilizing step would not be required. This is especially true in aseptic or sterile packaging machines wherein the product is created in a sterile manner so that the resultant flexible container housing the product does not have to be terminally sterilized.

As set forth above, the web of film that is to be utilized to create a flexible container for housing medical products must meet certain criteria and demands. Among these demands is the ability to create sufficiently strong heat seals so t hat the web of film can be sealed onto itself, or onto an identical web of film, to create a container. In the medical industry, again, the strength of such heat seals is critical. For flexible containers that house parenteral products, the resultant containers, typically, must survive a six foot drop test.

Furthermore, the webs of film should have constructions that allow them to be processed on conventional machinery to create flexible containers; otherwise, the packaging machinery would have to be modified. In this regard, the web of film should be constructed so that it can be processed on conventional machinery and can be sealed utilizing conventional machinery, or conventional machinery that is slightly modified, and still provide sufficiently strong seals.

SUMMARY OF THE INVENTION

The present invention provides improved film structures for creating two webs of film, each web preferably having a sterile surface.

In an embodiment of the present invention, the structure comprises: a first layer of polyvinyl chloride; a second layer of polyester; a third layer of polyvinylidene chloride; a fourth layer of a material that does not adhere to a polyvinylidene chloride layer; a fifth layer of polyvinylidene chloride; a sixth layer of polyester; and a seventh layer of polyvinyl chloride. Because the fourth layer does not adhere to the polyvinylidene chloride layers, by stripping the third and fifth layers from the fourth layer, two webs of film are created wherein a surface of the third and fifth layers is sterile.

In another embodiment of the present invention, the film comprises: a first layer of polyester; a second layer of polyvinyl chloride; a third layer of polyester; a fourth layer of polyvinylidene chloride; a fifth layer of a material that will not adhere to a polyvinylidene chloride layer; a sixth layer of polyvinylidene chloride; a seventh of layer of polyester; an eighth layer of polyvinyl chloride; and a ninth layer of polyester. Again, by stripping the fourth and sixth layers from the fifth layer, two webs of film are created, each having a sterile surface.

In another embodiment of the present invention, the film comprises: a first layer of polyvinyl chloride; a second layer of polyester; a third layer of polyvinylidene chloride; a fourth layer of polyester; a fifth layer of a material that will not adhere to a polyester layer; a sixth layer of polyester; a seventh layer of polyvinylidene chloride; an eighth layer of polyester; and a ninth layer of polyvinyl chloride. Likewise, by stripping the fourth and sixth layers from the fifth layer, two webs of film are produced, each having a sterile surface.

In another embodiment of the film of the present invention, the film comprises: a first layer of polyester; a second layer of polyvinyl chloride; a third layer of polyester; a fourth layer of polyvinylidene chloride; a fifth layer of polyester; a sixth layer of a material that will not adhere to a polyester layer; a seventh layer of polyester; an eighth layer of polyvinylidene chloride: a ninth layer of polyester; a tenth layer of polyvinyl chloride; and an eleventh layer of polyester. By stripping the fifth and seventh layers from the sixth layer, two webs of film are created, each layer including a sterile surface.

In an embodiment of the above films, the polyvinyl chloride layers do not include a DEHP plasticizer or epoxidized oil. In a further embodiment of the above films, the polyvinyl chloride layers include polyvinyl chloride having an ethylene-vinyl acetate copolymer as a plasticizer.

In a preferred embodiment of the above-identified film structures, the polyester layers include a polycyclohexane-dimethylcyclohexane di-carboxylate elastomer.

In an embodiment of the film structures of the present invention, the strippable layer includes a material chosen from the group consisting of polypropylene and polyethylene.

An advantage of the present invention is that it provides film structures that can be utilized to create webs of film for creating flexible containers.

A further advantage of the present invention is that it provides film structures that can be used to produce improved webs of film.

Another advantage of the present invention is that it provides film structures that can be utilized to provide two webs of film, each of the webs of film having a sterile surface.

Additionally, an advantage of the present invention is that it provides a web of film that can be utilized to create a flexible bag that can house parenteral products including intravenous solutions dialysis solutions, frozen drugs, nutrition products, respiratory therapy products, and plasma.

Furthermore, an advantage of the present invention is that it provides webs of film that can be run on conventional packaging machinery to create flexible containers for housing a product.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a film structure capable of producing two webs of film, each having a sterile surface, that can be processed into flexible containers. More specifically, the webs of film produced by the film structures of the present invention can be utilized to produce flexible containers capable of containing a fluid or solid to be maintained and removed under sterile conditions. These containers typically consist of a liquid containment body defined by sealed walls. In the medical industry, the containers are utilized to package, inter alia, parenteral products including intravenous solutions, dialysis solutions, frozen drugs, nutrition products, respiratory therapy products, and plasma.

Figure 1:
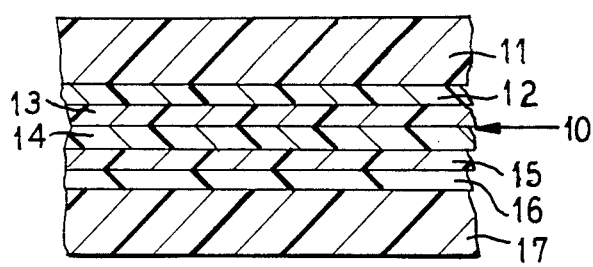
FIG. 1 illustrates a schematic cross-sectional view of an embodiment of the film of the present invention.

Referring to FIG. 1, a cross-sectional perspective of a portion of an embodiment of a film structure 10 of the present invention is illustrated. The film structure 10 illustrated includes seven layers.

The first and seventh layers, 11 and 17 respectively, of the film 10 are constructed from a polyvinyl chloride. The second and sixth layers, 12 and 16 respectively, are constructed from a polyester. The third and fifth layers, 13 and 15 respectively, are constructed from polyvinylidene chloride. The fourth layer 14 is constructed from a material that will not adhere to a polyvinylidene chloride layer.

Accordingly, the fourth layer 14 functions as a strippable layer allowing the third layer 13 and fifth layer 15 to be removed therefrom creating two webs of film. The resultant two webs of film have the following identical structure: polyvinyl chloride/polyester/polyvinylidene chloride. Preferably, a surface of the polyvinylidene chloride layer for each of the webs of film is sterile. The method for stripping the film is discussed below with reference to FIG. 5.

This film structure 10 provides two webs of film that can be utilized on conventionally available packaging machines to create flexible containers. More specifically, because each of the webs of film will include a sterile surface, the film can be utilized to create flexible containers for containing medical products.

Preferably, the film structure 10 has a thickness of approximately 0.0124 to about 0.057 inches. More specifically, preferably: the first layer 11 has a thickness of approximately 0.005 to about 0.020 inches; the second layer 12 has a thickness of approximately 0.0002 to about 0.002 inches: the third layer 13 has a thickness of approximately 0.0005 to about 0.004 inches; the fourth layer 14 has a thickness of approximately 0.001 to about 0.005 inches; the fifth layer 15 has a thickness of approximately 0.0005 to about 0.004 inches; the sixth layer 16 has a thickness of approximately 0.0002 to about 0.002 inches; and the seventh layer 17 has a thickness of approximately 0.005 to about 0.020 inches.

Figure 2:
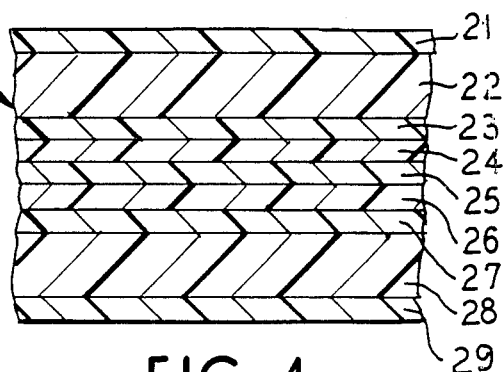
FIG. 2 illustrates a schematic cross-sectional view of another embodiment of the film of the present invention.

Referring now to FIG. 2, another embodiment of the film structure of the present invention is illustrated. As illustrated, the film structure 20 includes nine layers. The first, third, seventh, and ninth layers, 21, 23, 27, and 29 respectively, are constructed from polyester. The second and eighth layers, 22 and 28 respectively, are constructed from polyvinyl chloride. The fourth and sixth layers, 24 and 26 respectively, are constructed from polyvinylidene chloride. The fifth layer 25 is constructed from a material that will not adhere to a polyvinylidene chloride layer.

Accordingly, the film structure 20 provides a film structure that can be utilized to create two webs of film, each web having the identical structure: polyester/polyvinyl chloride/polyester/polyvinylidene chloride. The webs of film are created by stripping the fifth layer 25 from the fourth and sixth layers, 24 and 26 respectively. Again, preferably, the polyvinylidene chloride layers, 24 and 26, of each so stripped web of film is in a sterile condition when so stripped.

Preferably, the film 20 has a thickness of approximately 0.0128 to about 0.061 inches. In a preferred embodiment: the first layer 21 has a thickness of approximately 0.0002 to about 0.002 inches; the second layer 22 has a thickness of approximately 0.005 to about 0.0020 inches; the third layer 23 has a thickness of approximately 0.0002 to about 0.002 inches; the fourth layer 24 has a thickness of approximately 0.0005 to about 0.004 inches; the fifth layer 25 has a thickness of approximately 0.001 to about 0.005 inches; the sixth layer 26 has a thickness of approximately 0.0005 to about 0.004 inches; the seventh layer 27 has a thickness of approximately 0.0002 to about 0.002 inches; the eighth layer 28 has a thickness of approximately 0.005 to about 0.020 inches; and the ninth layer 29 has a thickness of approximately 0.0002 to about 0.002 inches.

Figure 3:
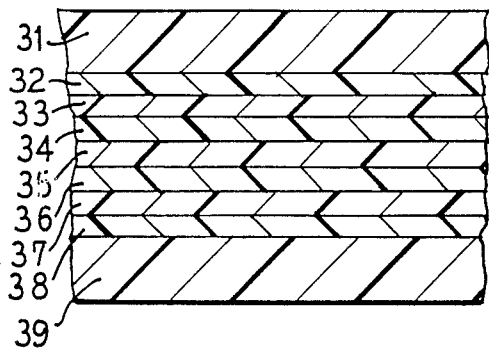
FIG. 3 illustrates a schematic cross-sectional view of another embodiment of the film of the present invention.

Referring now to FIG. 3, another embodiment of the film structure of the present invention is illustrated. As illustrated, the film structure 30 includes nine separate layers. The first and ninth layer, 31 and 39 respectively, are constructed from polyvinyl chloride. The second, fourth, sixth, and eighth layers, 32, 34, 36, and 38 respectively, are constructed from polyester. The third and seventh layers, 33 and 37 respectively, are constructed from polyvinylidene chloride. The fifth layer 35 is constructed from a material that will not adhere to a polyester layer.

Again, due to the strippable layer 35, the film structure 30 provides a structure that will afford two webs of film, each having the structure: polyvinyl chloride/polyester/polyvinylidene chloride/polyester, when the fourth layer 34 and sixth layer 36 are stripped from the fifth layer 35.

Preferably, the film structure 30 has a thickness of approximately 0.0128 to about 0.061 inches. In a preferred embodiment, the film 30 includes the following layer thicknesses: the first layer 31 is approximately 0.005 to about 0.020 inches thick; the second layer 32 is approximately 0.0002 to about 0.002 inches thick; the third layer 33 is approximately 0.0005 to about 0.004 inches thick; the fourth layer 34 is approximately 0.0002 to about 0.002 inches thick; the fifth layer 35 is approximately 0.001 to about 0.005 inches thick; the sixth layer 36 is approximately 0.0002 to about 0.002 inches thick; the seventh layer 37 is approximately 0.0005 to about 0.004 inches thick; the eighth layer 38 is approximately 0.0002 to about 0.002 inches thick; and the ninth layer 39 is approximately 0.005 to about 0.020 inches thick.

Figure 4:
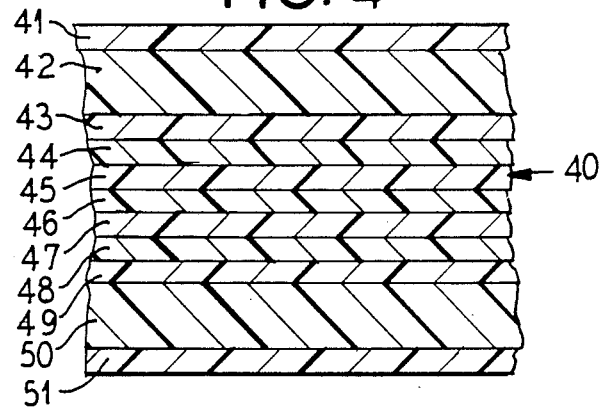
FIG. 4 illustrates a schematic cross-sectional view of another embodiment of the film of the present invention.

Referring now to FIG. 4, another embodiment of the film structure of the present invention is illustrated. As illustrated, the film 40 includes eleven separate layers. The first, third, fifth, seventh, ninth, and eleventh layers, 41, 43, 45, 47, 49, and 51 respectively, are constructed from polyester. The second and tenth layers, 42 and 50 respectively, are constructed from polyvinyl chloride. The fourth and eighth layers, 44 and 48 respectively, are constructed from polyvinylidene chloride. The sixth layer 46 is constructed from a material that will not adhere to a polyester layer.

Accordingly, again, a film structure 40 is provided that will create two identical webs of film, each preferably having a sterile surface and having the structure: polyester/polyvinyl chloride/polyester/polyvinylidene chloride/polyester. These webs of film are created by stripping the fifth layer 45 and seventh layer 47 from the sixth layer 46.

Preferably, the film 40 has a thickness of approximately 0.0132 to about 0.065 inches. In a preferred embodiment, the film structure 40 includes layers having the following thicknesses: the first layer 41 has a thickness of approximately 0.0002 to about 0.002 inches; the second layer 42 has a thickness of approximately 0.005 to about 0.020 inches; the third layer 43 has a thickness of approximately 0.0002 to about 0.002 inches; the fourth layer 44 has a thickness of approximately 0.0005 to about 0.004 inches; the fifth layer 45 has a thickness of approximately 0.0002 to about 0.002 inches; the sixth layer 46 has a thickness of approximately 0.001 to about 0.005 inches; the seventh layer 47 has a thickness of approximately 0.0002 to about 0.002 inches; the eighth layer 48 has a thickness of approximately 0.0005 to about 0.004 inches; the ninth layer 49 has a thickness of approximately 0.0002 to about 0.002 inches; the tenth layer 50 has a thickness of approximately 0.005 to about 0.020 inches; and the eleventh layer 51 has a thickness of approximately 0.0002 to about 0.002 inches.

For each of the above film structures, 10, 20, 30, and 40 respectively, preferably, the polyvinyl chloride layers do not include a DEHP plasticizer or epoxidized oil. In a preferred embodiment, the polyvinyl chloride material includes an ethylene-vinyl acetate copolymer. The ethylene-vinyl acetate copolymer functions as a plasticizer. A polyvinyl chloride film that does not include a DEHP plasticizer or epoxidized oil is available from Sekisui America Corporation, 780 Third Avenue, Suite 3102, New York, New York 10017 under the tradename "Esmedica V" has been found to function satisfactorily in the present invention.

In the above film structures, 10, 20, 30, and 40 respectively, in a preferred embodiment, the polyester layer includes a polycyclohexane-dimethylcycolohexane dicarboxylate elastomer. A polyester available from Eastman Chemical Products Inc. Kingsport Tennessee 37662 under the name "PCCE Elastomeric Polyester" has been found to function satisfactorily in the present invention.

Preferably, the polyvinylidene chloride is SARAN available from Dow Chemical Company. A SARAN available from Dow Chemical Company under the designation 516 has been found to function satisfactorily in the present invention.

Preferably, the strippable layer is either polypropylene or polyethylene. In an embodiment, the polypropylene is a homopolymer. Polypropylene available from El Paso under the designation PP23M2 has been found to function satisfactorily in the present invention In an embodiment, the polyethylene is LDPE. Polyethylene available from DuPont under the designation Alathon 20 has been found to function satisfactorily in the present invention.

Figure 5:
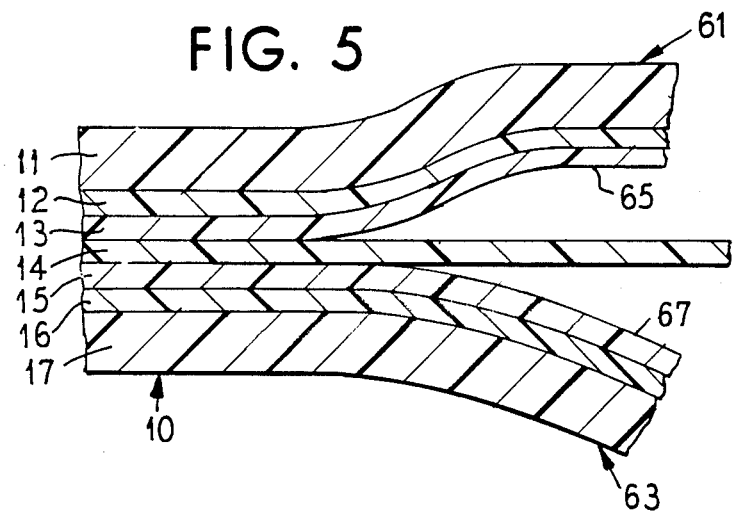
FIG. 5 illustrates a schematic cross-sectional view of the stripping of two webs of film from a strippable layer.

Referring now to FIG. 5, a schematic representation of a method for creating two webs of film from the film structures 10, 20, 30, and 40 of the present invention is illustrated. Although the method illustrated utilizes the film structure 10 set forth in FIG. 1, it should be appreciated that any of the film structures of the present invention can be utilized to create two webs of film through the method illustrated.

As illustrated, the third layer 13 and fifth layer 15 are stripped from the fourth strippable layer 14 creating two three layer films 61 and 63. Each of the three layer films 61 and 63 are identical and includes a sterile surface 65 and 67 respectively.

Figure 6:
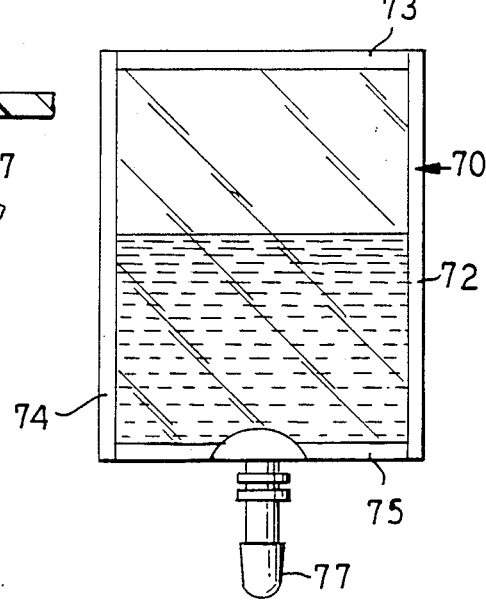
FIG. 6 illustrates a perspective view of a flexible container constructed from the web of film of the present invention.

Referring now to FIG. 6, a container 70 that can be constructed from a web of film produced from the film structures 10, 20, 30, and 40 is illustrated. The container 51 is sealed on four sides 72, 73, 74 and 75 to create an interior for housing the product. The container 70 can include a port 77 for accessing the contents of the container. It should be noted that if the container is produced on a form, fill, seal packaging machine, the container would only be sealed on three sides.

The container 70 can be created on a standard packaging machine by feeding the web of film into the machine. In this regard, one of the advantages of the present invention is that the film structure 10, 20, 30, and 40 can be fed to the packaging machine and the webs of film can be stripped from the strippable layer as it is fed into the machine, or in an area within the machine. This will provide a web of film having a sterile surface that can define the interior surface of the container.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A film structure comprising:
   a first layer of polyvinyl chloride;
   a second layer of polyester;
   a third layer of polyvinylidene chloride;.
   a fourth layer of a material that does not adhere to a polyvinylidene chloride layer;
   a fifth layer of polyvinylidene chloride;
   a sixth layer of polyester; and
   a seventh layer of polyvinyl chloride.

2. The film of claim 1 wherein the polyvinyl chloride layers do not include a DEHP plasticizer.

3. The film of claim 1 wherein the polyvinyl chloride layers include polyvinyl chloride including an ethylene-vinyl acetate copolymer as a plasticizer.

4. The film of claim 1 wherein the polyester layers include a polycyclohexane-dimethylcyclohexane dicarboxylate elastomer.

5. The film of claim 1 wherein the fourth layer includes a material chosen form the group consisting of polypropylene and polyethylene.

6. The film of claim 2 including:
   a layer of polyester on the first layer; and
   a layer of polyester on the seventh layer.

7. A film structure comprising:
   a first layer of polyester;
   a second layer of polyvinyl chloride;
   a third layer of polyester;
   a fourth layer of polyvinylidene chloride;
   a fifth layer of a material that does not adhere to a polyvinylidene chloride layer;
   a sixth layer of polyvinylidene chloride;
   a seventh layer of polyester;
   an eighth layer of polyvinyl chloride; and
   a ninth layer of polyester.

8. The film of claim 7 wherein the polyester and polyvinyl chloride layers do not include a DEHP plasticizer or epoxidized oil.

9. The film of claim 7 wherein the polyvinyl chloride layers include polyvinyl chloride including an ethylene-vinyl acetate copolymer as a plasticizer.

10. The film of claim 7 wherein the polyester layers include a polycyclohexane-dimethylcyclohexane dicarboxylate elastomer.

11. The film of claim 7 wherein the fifth layer includes a material chosen form the group consisting of polypropylene and polyethylene.

12. A film structure for providing two webs of film, each web of film having a sterile surface, comprising:
    a first layer of polyvinyl chloride;
    a second layer of polyester;
    a third layer of polyvinylidene chloride:
    a fourth layer of a material that does not adhere to a layer of polyvinylidene chloride;
    a fifth layer of polyvinylidene chloride;
    a sixth layer of polyester;
    a seventh layer of polyvinyl chloride; and
    the two webs of film being produced by stripping the third layer from the fourth layer and the fifth layer from the fourth layer 13. The film of claim 12 wherein the polyvinyl chloride layers do not include a DEHP plasticizer.

14. The film of claim 12 wherein the polyvinyl chloride layers include polyvinyl chloride including an ethylene-vinyl acetate copolymer as a plasticizer.

15. The film of claim 12 wherein the polyester layers include a polycyclohexane-dimethylcyclohexane dicarboxylate elastomer.

16. The film of claim 12 wherein the fourth layer includes a material chosen form the group consisting of polypropylene and polyethylene.

17. The film of claim 13 including:
    a layer of polyester on the first layer; and
    a layer of polyester on the seventh layer.

18. A film structure for providing two webs of film, each web of film having a sterile surface, comprising:
    a first layer of polyester;
    a second layer of polyvinyl chloride;
    a third layer of polyester;
    a fourth layer of polyvinylidene chloride;
    a fifth layer of a material that does not adhere to a layer of polyvinylidene chloride;
    a sixth layer of polyvinylidene chloride;
    a seventh layer of polyester;
    an eighth layer of polyvinyl chloride;
    a ninth layer of polyester; and the two webs of film being produced by stripping the fourth layer from the fifth layer and the sixth layer from the fourth layer.

19. The film of claim 18 wherein the polyester and polyvinyl chloride layers do not include a DEHP plasticizer or epoxidized oil.

20. The film of claim 18 wherein the polyvinyl chloride layers include polyvinyl chloride including ethylene-vinyl acetate copolymer as a plasticizer.

21. The film of claim 18 wherein the polyester layers include a polycyclohexane-dimethylcyclohexane dicarboxylate elastomer.

22. The film of claim 18 wherein the fifth layer includes a material chosen from the group consisting of polypropylene and polyethylene.

23. A film comprising:
    a first layer of polyvinyl chloride;
    a second layer of polyester;
    a third layer of polyvinylidene chloride;
    a fourth layer of polyester;
    a fifth layer of a material that does not adhere to a polyester layer;
    a sixth layer of polyester;
    a seventh layer of polyvinylidene chloride;
    an eighth layer of polyester; and
    a ninth layer of polyvinyl chloride.

24. The film of claim 23 wherein the polyvinyl chloride layers do not include a DEHP plasticizer.

25. The film of claim 23 wherein the polyvinyl chloride layers include polyvinyl chloride including ethylene-vinyl acetate copolymer as a plasticizer.

26. The film of claim 23 wherein the polyester layers include a polycyclohexane-dimethylcyclohexane dicarboxylate elastomer.

27. The film of claim 23 wherein the fifth layer includes a material chosen form the group consisting of polypropylene and polyethylene.

28. The film of claim 24 including:
    a layer of polyester on the first layer; and
    a layer of polyester on the ninth layer.

29. A film structure comprising:
    a first layer of polyester;
    a second layer of polyvinyl chloride;
    a third layer of polyester;
    a fourth layer of polyvinylidene chloride;
    a fifth layer of polyester;

a sixth layer of a material that does not adhere to a polyester layer;

a seventh layer of polyester;

an eighth layer of polyvinylidene chloride;

a ninth layer of polyester;

a tenth layer of polyvinyl chloride; and an eleventh layer of polyester.

30. The film of claim 29 wherein the polyester and polyvinyl chloride layers do not include a DEHP plasticizer or epoxidized oil.

31. The film of claim 29 wherein the polyvinyl chloride layers include polyvinyl chloride including ethylene-vinyl acetate copolymer as a plasticizer.

32. The film of claim 29 wherein the polyester layers include a polycyclohexane-dimethylcyclohexane dicarboxylate elastomer.

33. The film of claim 29 wherein the sixth layer includes a material chosen form the group consisting of polypropylene and polyethylene.

34. A film for providing two webs of film, each web of film having a sterile surface comprising:

a first layer of polyvinyl chloride;

a second layer of polyester;

a third layer of polyvinylidene chloride;

a fourth layer of polyester;

a fifth layer of a material that does not adhere to layer of polyester;

a sixth layer of polyester;

a seventh layer of polyvinylidene chloride;

an eighth layer of polyester;

a ninth layer of polyvinyl chloride; and the two webs of film being produced by stripping the fourth and sixth layers from the fifth layer.

35. The film of claim 34 wherein the polyvinyl chloride layers do not include a DEHP plasticizer or epoxidized oil.

36. The film of claim 34 wherein the polyvinyl chloride layers include polyvinyl chloride including an ethylene-vinyl acetate copolymer as a plasticizer.

37. The film of claim 34 wherein the polyester layers include polycyclohexane-dimethylcyclohexane dicarboxylate elastomer.

38. The film of claim 34 wherein the fourth layer includes a material chosen from the group consisting of polypropylene and polyethylene.

39. The film of claim 35 including:

a layer of polyester on the first layer; and a layer of polyester on the ninth layer.

40. A film for providing two webs of film, each web of film having a sterile surface comprising:

a first layer of polyester;

a second layer of polyvinyl chloride;

a third layer of polyester;

a fourth layer of polyvinylidene chloride;

a fifth layer of polyester;

a sixth layer of a material that does not adhere to a layer of polyester;

a seventh layer of polyester;

an eighth layer of polyvinylidene chloride;

a ninth layer of polyester;

a tenth layer of polyvinyl chloride;

an eleventh layer of polyester; and the two webs of film being produced by stripping the fifth and seventh layers from the sixth layers.

41. The film of claim 40 wherein the polyester and polyvinyl chloride layers do not include a DEHP plasticizer.

42. The film of claim 40 wherein the polyvinyl chloride layers include polyvinyl chloride including an ethylene-vinyl acetate copolymer as a plasticizer.

43. The film of claim 40 wherein the polyester layers include a polycyclohexane-dimethylcyclohexane dicarboxylate elastomer.

44. The film of claim 40 wherein the sixth layer includes a material chosen from the group consisting of polypropylene and polyethylene.

* * * * *

UNITED STATES PATENT AND TRADEMARK OFFICE
CERTIFICATE OF CORRECTION

PATENT NO. : 4,978,579

DATED : 12-18-90

INVENTOR(S) : Larry A. Rosenbaum

It is certified that error appears in the above-identified patent and that said Letters Patent is hereby corrected as shown below:

In column 4, line 54, the text reads "0.0020 inches; the third layer"; it should correctly read ---0.020 inches; the third layer...

In column 6, line 13, the correct spelling of the polyester -- polycyclohexane-dimethylcyclohexane dicarboxylate elastomer--.

Signed and Sealed this

Twenty-fourth Day of November, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,978,579
DATED : 12-18-90
INVENTOR(S) : Larry A. Rosenbaum

It is certified that error appears in the above-identified patent and that said Letters Patent is hereby corrected as shown below:

In column 4, line 54, the text reads "0.0020 inches; the third layer"; it should correctly read ---0.020 inches; the third layer... ---.

In column 6, line 13, the correct spelling of the polyester is---polycyclohexane-dimethylcyclohexane dicarboxylate elastomer---.

Signed and Sealed this

First Day of December, 1992

Attest:

DOUGLAS B. COMER

Attesting Officer

Acting Commissioner of Patents and Trademarks